United States Patent [19]

Hanaoka

[11] Patent Number: 5,428,960

[45] Date of Patent: Jul. 4, 1995

[54] MASTER CYLINDER

[75] Inventor: Mituhiro Hanaoka, Nagano, Japan

[73] Assignee: Nissin Kogyo Co., Ltd., Japan

[21] Appl. No.: 134,569

[22] Filed: Oct. 8, 1993

[30] Foreign Application Priority Data

Feb. 26, 1993 [JP] Japan .................. 5-038533

[51] Int. Cl.$^6$ .................. F15B 7/00; B60T 11/20
[52] U.S. Cl. .................. 60/533; 60/562;
92/165 R; 92/DIG. 1; 277/188 R; 277/205;
384/37
[58] Field of Search .................. 60/533, 562, 581;
92/165, 168, DIG. 1, DIG. 2; 277/188 R, 205,
198; 384/16, 37, 41, 42

[56] References Cited

U.S. PATENT DOCUMENTS

| 4,324,438 | 4/1982 | Lister .................. 384/16 X |
| 4,540,186 | 9/1985 | Beidler .................. 277/188 R X |
| 4,867,460 | 9/1989 | Colo et al. .................. 277/205 X |
| 4,890,937 | 1/1990 | Balseus .................. 384/16 |
| 4,939,901 | 7/1990 | Saalbach et al. .................. 60/562 |
| 5,098,071 | 3/1992 | Umetsu .................. 384/16 X |

FOREIGN PATENT DOCUMENTS

| 143344 | 12/1989 | Japan . |
| 571073 | 9/1993 | Japan . |
| 2144501A | 3/1985 | United Kingdom . |
| 2148434A | 5/1985 | United Kingdom . |

Primary Examiner—Edward K. Look
Assistant Examiner—Hoang Nguyen
Attorney, Agent, or Firm—Whitham, Curtis, Whitham & McGinn

[57] ABSTRACT

The master cylinder of the present invention is provided with the bearing in which a bearing body includes the inner circumferencial seal groove which is formed with a L-shape in longitudinal section with one side surface thereof opened, and a set plate is secured to an end surface of the bearing body so as to close the opened side surface of the inner circumferencial seal groove, wherein the set plate has a plurality of engaging pawls formed thereon for resiliently to pressing the bearing body onto a stopper ring or pressing the bearing body onto a step portion between a cylinder hole and the bearing housing while elastically holding the bearing body, whereby the seal member can easily be fitted into an inner circumferencial seal groove, of a bearing while preventing the bearing from chattering and preventing the seal member from being deformed seriously.

18 Claims, 3 Drawing Sheets 5,428,960

MASTER CYLINDER

BACKGROUND OF THE INVENTION

The present invention relates to a master cylinder for operating a brake device, a clutch device or the like in an automobile, and more particularly to an improvement of a master cylinder in which a bearing housing is coupled to a rear end of a cylinder hole of a cylinder body through a step portion expanding outwardly in a radial direction, a bearing is fitted into the bearing housing so that the bearing slidably supports a piston rod projecting from a rear end surface of a piston in the cylinder hole, a stopper ring is engaged on the side of an entrance of the bearing housing, the bearing is held by the step portion and the stopper ring, a seal member is slidably engaged on an outer circumferential surface of the piston rod, and an inner circumferential seal groove is formed on an inner circumferential surface of the bearing for fitting the seal member thereinto.

Such a conventional master cylinder is disclosed in e.g., Examined Japanese Utility Model Publication No. Hei. 1-43344. With the conventional master cylinder, a bearing is restrained from moving in an axial direction in such a manner that a circlip serving as a stopper ring is opposite to a rear end surface of the integrated bearing. However, a clearance is unavoidably generated by processing between opposite surfaces of the bearing and circlip. Therefore, the bearing generates a chatter noise due to the clearance. Further, since an inner circumferential seal groove, which is formed on an inner circumferential surface of the bearing, has a U-shape in longitudinal section along a center axis of a cylinder body, a seal member must be seriously deformed for being fitted into the inner circumferential seal groove, thereby to be in danger of damaging the seal member.

SUMMARY OF THE INVENTION

The present invention has been made in view of the above circumstances involved in a conventional master cylinder.

An object of the present invention is to provide a master cylinder in which a seal member can easily be fitted into an inner circumferential seal groove of a bearing while preventing the bearing from chattering and preventing the seal member from being deformed seriously.

To accomplish the above object, the master cylinder of the present invention is provided with the bearing which is characterized in that a bearing body includes the inner circumferential seal groove which is formed with a L-shape in longitudinal section with one side surface thereof opened, and a set plate is secured to an end surface of the bearing body so as to close the opened side surface of the inner circumferential seal groove, wherein the set plate has a plurality of engaging pawls formed thereon for resiliently pressing the bearing body onto a stopper ring or pressing the bearing body onto a step portion between a cylinder hole and the bearing housing while elastically holding the bearing body.

DETAILED DESCRIPTION OF THE PREFERRED EMBODIMENTS

Preferred embodiments of the present invention will be described with reference to the accompanying drawings.

Figure 1:
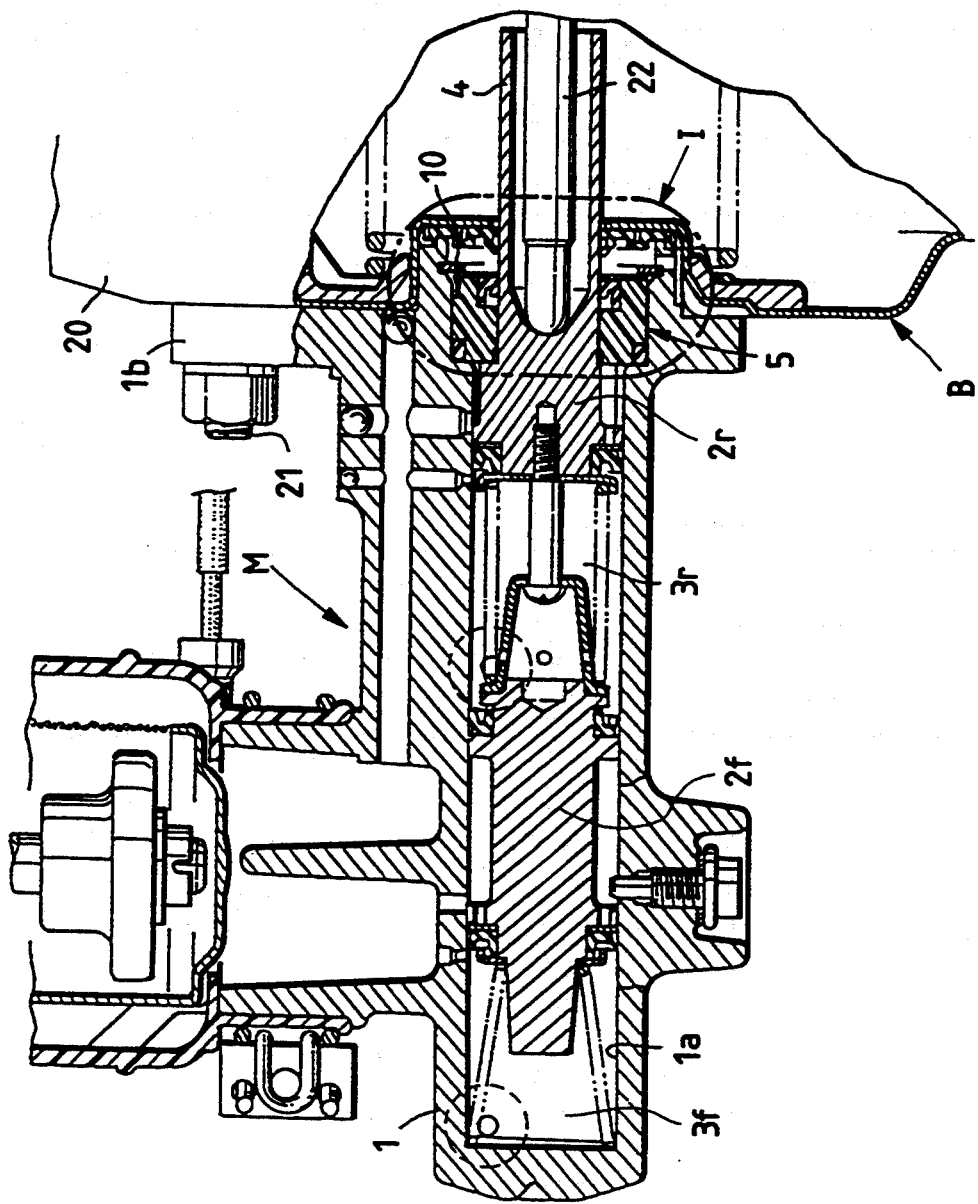
FIG. 1 is a longitudinal sectional view showing a master cylinder which constitutes a first embodiment of the present invention.

A first embodiment of the present invention will be described through FIGS. 1 to 4. As shown in FIG. 1, a brake master cylinder M for an automobile is provided in tandem with a pair of front and rear pistons $2f$ and $2r$ which are slidably fitted into a cylinder hole $1a$ of a cylinder body 1. An inner part of the cylinder hole $1a$ is divided into independent oil pressure chambers $3f$ and $3r$ by both the pistons $2f$ and $2r$. When the rear piston $2r$ is moved forwardly, an oil pressure generated in the oil pressure chambers $3f$ and $3r$ is supplied to predetermined wheel brake devices (not shown) of the automobile.

A piston rod 4 extending rearwardly from the cylinder body 1 is unitedly protruded at a rear end of the rear piston $2r$. A bearing 5 is fitted into the cylinder body 1 so that the piston rod 4 is slidably supported and the limit of backward displacement of the rear piston $2r$ is regulated.

Figure 2:
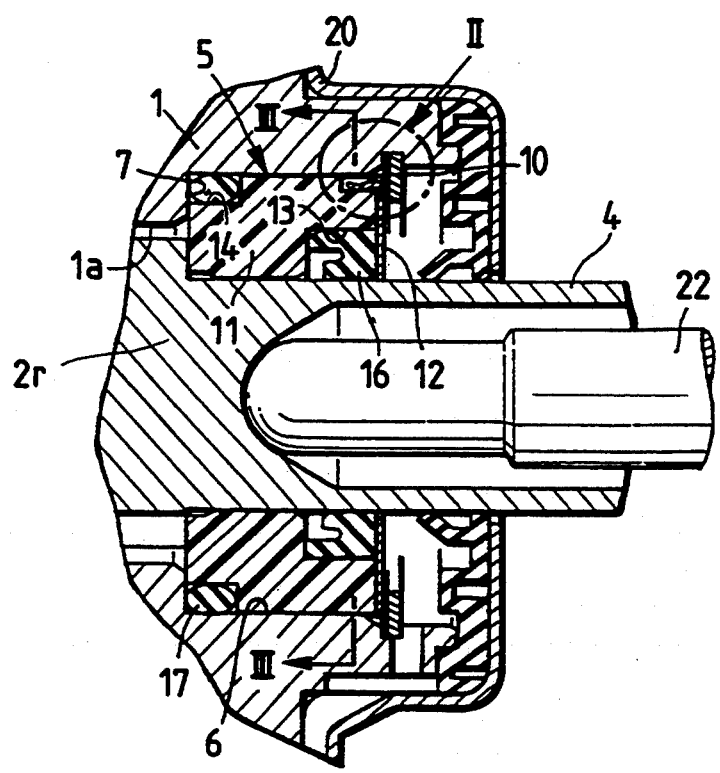
FIG. 2 is an enlarged sectional view of an area I in FIG. 1.
Figure 3:
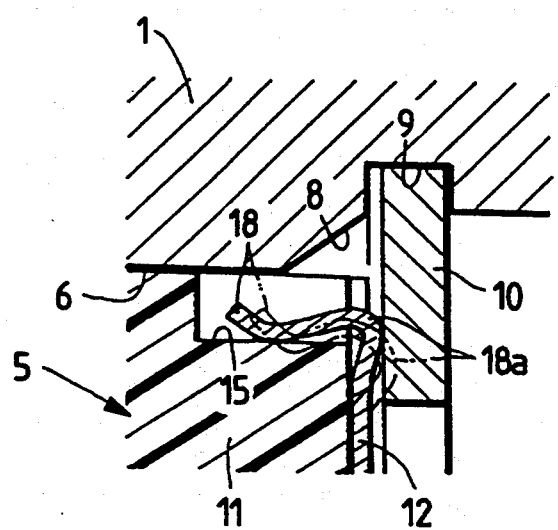
FIG. 3 is an enlarged sectional view of an area II in FIG. 2.

As shown in FIGS. 2 and 3, a bearing housing 6 is formed in a line at a rear end portion of the cylinder body 1 through a step portion 7 expanding outwardly in a radial direction at a rear end of the cylinder hole $1a$. A tapered guiding hole 8 ranges with the bearing housing 6 so as to expand rearwardly toward an entrance of the bearing housing 6. An annular engaging groove 9 is further provided at a rear end of the guiding hole 8. A circlip 10 serving as a stopper ring is engaged with the engaging groove 9 in order to extract and fix the bearing 5, so that the bearing 5 is fitted into the bearing housing 6.

Figure 4:
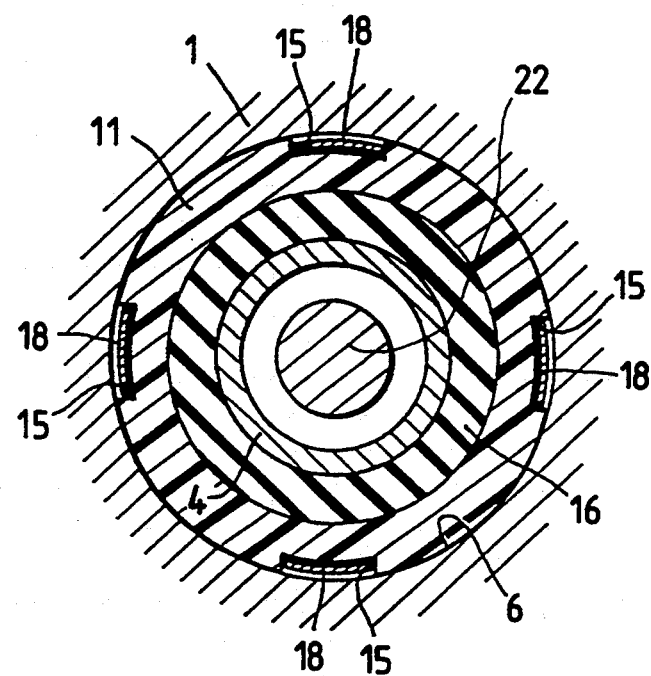
FIG. 4 is a transverse sectional view taken along an arrow III—III in FIG. 2.

The bearing 5 is consisted of a bearing body 11 molded by injecting with a synthetic resin and a set plate 12 made of a metal. An inner circumferential seal groove 13 is formed on an inner circumferential surface of the bearing body 11. The inner circumferential seal groove 13 has a L-shape in longitudinal section along a center axis of the cylinder body 1. The inner circumferential seal groove 13 has a rear surface thereof opened. An outer circumferential seal groove 14 is formed on an outer circumferential surface of the bearing body 11. The outer circumferential seal groove 14 has a L-shape in longitudinal section along the center axis of the cylinder body 1. The outer circumferential seal groove 14 has a front surface thereof opened. A plurality of concave portions 15 having a rear surface thereof opened are formed on an outer circumferential surface of the bearing body 11, and are arranged at same intervals in a circumferential direction (as best shown in FIG. 4).

A cup-shaped seal member 16 is fitted into the inner circumferential seal groove 13 in such a manner that the seal member 16 is slidably engaged with the outer circumferential surface of the piston rod 4. An O-shaped ring 17 is fitted into the piston rod 4 in such a manner that the O-shaped ring 17 is sealingly engaged with the inner circumferential surface of the bearing housing 6.

The set plate 12 is formed annularly so as to be secured to the rear end surface of the bearing body 11 for closing the opened rear surface of the inner circumferential seal groove 13. A plurality of engaging pawls 18 are formed on an outer circumference of the set plate 12 in such a manner that the engaging pawls 18 are bent forwardly to be engaged with a plurality of the concave portions 15. End portions of the engaging pawls 18 are inwardly positioned from a bottom surface of the concave portions 15 in a radial direction in a free mode as viewed with a phantom line in FIG. 3, so that the engaging pawls 18 resiliently hold the bearing body 11 in the respective concave portions 15. Further, base portions 18a of the engaging pawls 18 are rearwardly projected as viewed with the phantom line in FIG. 3, so that the base portions 18a elastically abuts against a front surface of the circlip 10.

As shown in FIG. 1, the cylinder body 1 is combined with a shell 20 of the B by a bolt 21 at a flange 1b provided in a front portion of the cylinder body 1. An output rod 22 is coupled to the piston rod 4 in the shell 20, so that the rear piston 2r is allowed to drive forwardly by a thrust of the output rod 22.

The operation of the embodiment will be described as follows.

In assembling the bearing 5, the seal member 16 and O-shaped ring 17 are fitted into the inner circumferential seal groove 13 and outer circumferential seal groove 14 of the bearing body 11, respectively. Then, the engaging pawls 18 are resiliently engaged with the concave portions 15 of the bearing body 11 to abut against the rear surface of the bearing body 11, so that the set plate 12 prevents the seal member 16 from being extracted from the inner circumferential seal groove 13. The bearing 5 providing the seal member 16 and O-shaped ring 17 is thus assembled.

Further, the bearing 5 is fitted into the bearing housing 6 through the guiding hole 8 of the cylinder body 1. The base portions 18a of the engaging pawls 18 of the set plate 12 are forwardly pressed to fit the circlip 10 into the engaging groove 9. Thus, the bearing 5 is assembled in such a manner as described above.

According to the embodiment, the bearing body 11 is pressed onto the step portion 7 between the cylinder hole 1a and the bearing housing 6 by the resilient force of the base portions 18a of the engaging pawls 18. Further, the circlip 10 is pressed onto a rear side wall of the engaging groove 9 by the resilient force. Therefore, the bearing 5 can be prevented from chattering. Further, since the opened front surface of the outer circumferential seal groove 14 is closed by the step portion 7, the O-shaped ring 17 can be prevented from separating from the outer circumferential seal groove 14.

On the other hand, since each of the inner circumferential seal groove 13 and outer circumferential seal groove 14 has the L-shape in longitudinal section with one side surface thereof opened, the bearing body 11, which has the inner circumferential seal groove 13 and outer circumferential seal groove 14 and is made of the synthetic resin, can easily be molded by injecting with a pair of simple metallic molds which are opened and closed in an axial direction. Further, during the injection molding, each of the inner circumferential seal groove 13 and outer circumferential seal groove 14 can be prevented from producing a flash.

Figure 5:
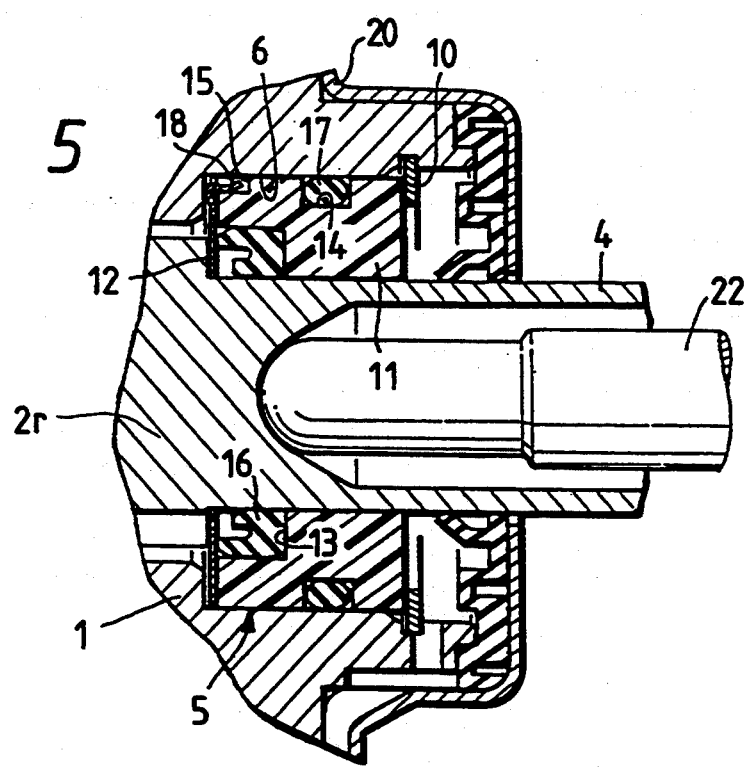
FIG. 5 is an enlarged sectional view showing the master cylinder which constitutes a second embodiment of the present invention, corresponding to the first embodiment of FIG. 2.

FIG. 5 shows a second embodiment of the present invention. The inner circumferential seal groove 13 and concave portions 15 having the L-shapes in longitudinal section are formed on the side of a front end of the bearing body 11. The set plate 12 is fitted to the front end of the bearing body 11. The base portions 18a of the engaging pawls 18 of the set plate 12 elastically abut against the step portion 7 between the cylinder hole 1a and bearing housing 6. A rear end of the bearing body 11 is forcibly abutted against the circlip 10 by the repulsive force of the base portions 18a. Further, at a center part of the outer circumferential surface of the bearing body 11, the outer circumferential seal groove 14 is formed with a U-shape in longitudinal section along the center axis of the cylinder body 1. In the second embodiment, the other components are similar to those of the first embodiment, and the components corresponding to the first embodiment are designated by the same reference numerals as shown in FIG. 5.

According to the second embodiment, the limit of backward displacement of the rear piston 2r is regulated by the set plate 12 made of a metal. Therefore, the bearing body 11 can desirably be prevented from being worn by which the rear piston 2r hits the bearing body 11 during a reciprocating movement.

While there has been described in connection with the preferred embodiments of the present invention, it will be obvious to those skilled in the art that various changes and modifications may be made therein without departing from the present invention. For instance, instead of a plurality of the concave portions 15, a series of the annular concave portions can be formed on the outer circumferential surface of the bearing body 11.

As described above, according to the present invention, the bearing is provided with the bearing body including the inner circumferential seal groove which is formed with the L-shape in longitudinal section with one side surface thereof opened, and the set plate secured to the end surface of the bearing body so as to close the opened side surface of the inner circumferential seal groove. The set plate has a plurality of the engaging pawls formed thereon for resiliently pressing the bearing body onto the stopper ring or pressing the bearing body onto the step portion between the cylinder hole and the bearing housing while elastically holding the bearing body. Therefore, the seal member can easily be fitted into an inner circumferential seal groove before the set plate is fitted to the bearing body. Further, the seal member cannot be damaged owing to being prevented from being deformed seriously. Moreover, after the set plate is fitted to the bearing body, the set plate can desirably prevent the seal member from being extracted from the inner circumferential seal groove, and prevent the bearing from chattering in the bearing housing.

What is claimed is:

1. A master cylinder, comprising:
   a cylinder body including a cylinder hole;
   a piston including a piston rod projecting from a rear end surface thereof in said cylinder hole;
   a bearing housing coupled to a rear end of said cylinder hole of said cylinder body;
   a seal member slidably engaged with said piston rod on an outer circumferential surface of said piston rod;
   a stopper ring engaged with said bearing housing on an entrance side of said bearing housing; and a bearing fitted into said beating housing for slidably supporting said piston rod, said bearing comprising:

a bearing body comprising an inner seal groove formed with a L-shape in longitudinal section along a center axis of said cylinder body, said inner seal groove having a side surface thereof opened; and a set plate secured to an end surface of said bearing body for closing said side surface of said inner seal groove and engaging said bearing body, said set plate contacting said stopper ting, said bearing body and said seal member, and for resiliently biasing said stopper ring, wherein said seal member is fitted into said inner seal groove and wherein said cylinder body includes a step portion expanding outwardly in a radial direction at said rear end of said cylinder hole so that said bearing is held by said step portion and said stopper ring.

2. The master cylinder of claim 1, wherein said bearing body comprises a plurality of concave portions with at least one surface thereof opened.

3. The master cylinder of claim 1, wherein a guiding hole is formed in said cylindrical body which expands rearwardly toward said entrance side of the bearing housing, said cylindrical body further including an engaging groove for engaging said stopper ring and thereby fitting said bearing into said bearing housing.

4. The master cylinder of claim 1, wherein said bearing comprises resin and said set plate comprises metal.

5. The master cylinder of claim 1, wherein said bearing body further includes an outer seal groove formed on an outer circumferential surface of said bearing body, said outer seal groove having an L-shape in longitudinal section along the center axis of said cylinder body, and having a side surface thereof opened.

6. The master cylinder of claim 1, further comprising an O-shaped ring fitted into said piston rod such that said O-shaped ring is sealingly engaged with an inner circumferential surface of said bearing housing.

7. The master cylinder of claim 1, wherein said bearing body comprises a plurality of concave portions with at least one surface thereof opened, said concave portions being arranged on an outer circumferential surface of said bearing body, wherein said set plate comprises a plurality of engaging pawls formed at an end thereof, said engaging pawls being engaged with said respective concave portions for elastically holding said bearing body.

8. The master cylinder of claim 1, wherein said bearing body comprises a plurality of concave portions with at least one surface thereof opened, said concave portions being arranged on an outer circumferential surface of said bearing body, said cylinder body including said step portion, wherein said set plate comprises a plurality of engaging pawls formed at an end thereof, said engaging pawls for engaging said respective concave portions for elastically holding said bearing body, and wherein said engaging pawls include base portions projected toward said stopper ring, said base portions resiliently abut against a surface of said stopper ring for pressing said bearing body onto said step portion.

9. The master cylinder of claim 1, wherein said bearing body comprises a plurality of concave portions with at least one surface thereof opened, said concave portions being arranged on an outer circumferential surface of said bearing body, wherein said set plate comprises a plurality of engaging pawls formed at an end thereof, said engaging pawls for engaging said respective concave portions for elastically holding said beating body, said cylinder body including said step portion, wherein said engaging pawls include base portions projected toward said step portion, said base portions resiliently abutting against a surface of said step portion for pressing said bearing body onto said stopper ring.

10. The master cylinder of claim 1, wherein said set plate includes means for preventing said seal member from being extracted from said inner seal groove.

11. The master cylinder of claim 1, wherein said set plate includes means for elastically engaging and holding said bearing body.

12. The master cylinder of claim 11, wherein said means for elastically holding includes a plurality of engaging pawls formed at an end thereof.

13. The master cylinder of claim 12, wherein said bearing body comprises a plurality of concave portions with at least one surface thereof opened, said concave portions being arranged on an outer circumferential surface of said bearing body, said engaging pawls for engaging said respective concave portions for elastically holding said bearing body, said cylinder body including said step portion, wherein said engaging pawls include base portions projected toward said step portion, said base portions resiliently abutting against a surface of said step portion for pressing said bearing body onto said stopper ring.

14. The master cylinder of claim 8, wherein said cylinder body includes said step portion expanding outwardly in a radial direction at an end of said cylinder hole, said base portions of said engaging pawls of said set plate elastically abut against the step portion between said cylinder hole and said bearing housing, wherein a rear end of said bearing body is forcibly abutted against said stopper ring by said base portions, and an outer circumferential seal groove has a U-shape in longitudinal section along a center axis of the cylinder body, at a center portion of the outer circumferential surface of said bearing body.

15. A master cylinder, comprising:

a cylinder body including a cylinder hole;

a piston including a piston rod projecting from a rear end surface thereof in said cylinder hole;

a bearing housing coupled to a rear end of said cylinder hole of said cylinder body;

a seal member slidably engaged with said piston rod on an outer circumferential surface of said piston rod;

a stopper ring engaged with said bearing housing on an entrance side of said bearing housing: and a bearing fitted into said bearing housing for slidably supporting said piston rod, said bearing comprising:

a bearing body comprising an inner seal groove formed with a L-shape in longitudinal section along a center axis of said cylinder body, said inner seal groove having one side surface thereof opened; and a set plate secured to an end surface of said bearing body for closing said side surface of said inner seal groove and engaging said bearing body, said seal member being fitted into said inner seal groove, wherein said cylinder body includes a step portion expanding outwardly in a radial direction at said rear end of said cylinder hole so that said bearing is held by said step portion and said stopper ring, and wherein said bearing body comprises a plurality of concave portions with at least one surface thereof opened, said concave portions being arranged on an outer circumferential surface of said bearing body at same intervals in a circumferential direction.

16. The master cylinder of claim 15, wherein said set plate comprises a plurality of engaging pawls formed at an end thereof and bent toward said concave portions, said engaging pawls for engaging said respective concave portions for elastically holding said bearing body.

17. The master cylinder of claim 16, wherein said engaging pawls include base portions projected toward said stopper ring, said base portions resiliently abutting against a surface of said stopper ring for pressing said bearing body onto said step portion.

18. The master cylinder of claim 16, wherein said engaging pawls include base portions projected toward said step portion, said base portions resiliently abutting against a surface of said step portion for pressing said bearing body onto said stopper ring.

* * * * *